April 20, 1943.  O. FOSBAK  2,317,048
SLED
Filed Dec. 12, 1940
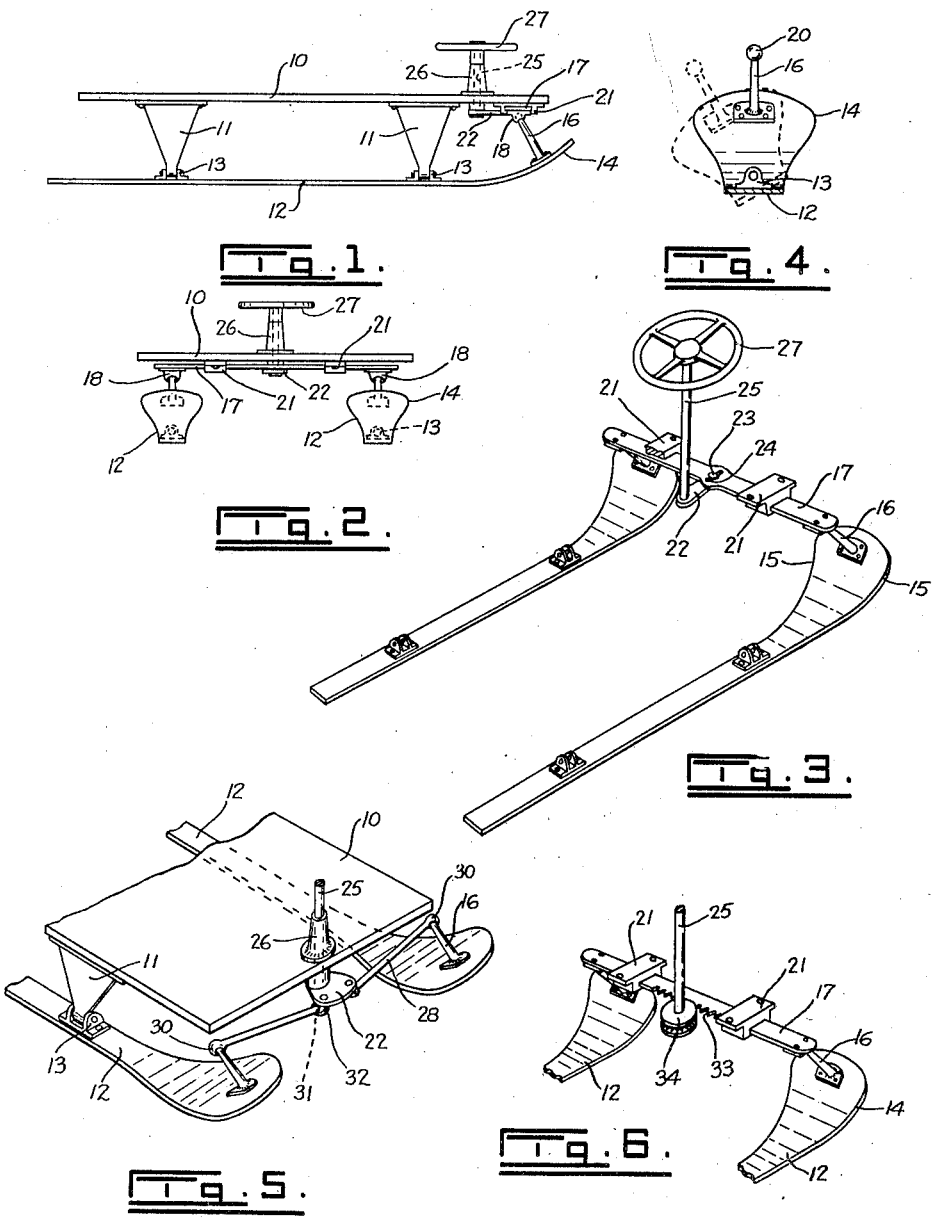
INVENTOR
Olaf Fosbak
BY Eugene E. Stevens
ATTORNEY Patented Apr. 20, 1943

2,317,048

UNITED STATES PATENT OFFICE 2,317,048

SLED

Olaf Fosbak, Bella Coola, British Columbia, Canada

Application December 12, 1940, Serial No. 369,890

6 Claims. (Cl. 280—21)

This invention relates to improvements in sleds.

An object of the present invention is the provision of a sled having improved steering and turning means.

Another object is the provision of a sled which may be steered by tilting its runners.

Another object is the provision of a sled which is steered by tilting its runners and having means for bracing the forward ends of the runners without interfering with the tilting thereof.

A further object is the provision of a sled including means for positively turning said sled.

A still further object is the provision of a device of the nature described of very simple and inexpensive construction.

With these and other objects in view, the present invention consists essentially of a sled comprising a supporting frame having legs, runners pivotally connected to the legs, the forward ends of said runners being curved upwardly, and steering means connected to the forward ends of the runners for tilting said runners to either side, as more fully described in the following specification and illustrated in the accompanying drawing, in which—

Figure 1 is a side elevation of a sled incorporating one form of the invention,

Figure 2 is a front elevation of the sled,

Figure 3 is a perspective view of the runners and steering means with the remainder of the sled removed, Figure 4 is a cross sectional view of a runner looking towards the forward end thereof, Figure 5 is a fragmentary perspective view of the forward end of a sled with another form of the invention, and Figure 6 is a perspective view of another alternative form of steering mechanism.

Referring more particularly to the drawing, 10 is a frame having a plurality of legs 11 adjacent each side thereof and runners 12 pivotally connected to the lower ends of the legs in any suitable manner, such as by means of hinges 13, which permit the runners to tilt laterally. These runners may be any width but they are preferably relatively wide, as shown, and they are formed with upwardly curving forward ends 14. Each end 14 flares laterally, as at 15, towards the outer end thereof and the flare preferably starts at the beginning of the curve of the end. A stem 16 is secured to each curved end 14 adjacent the outer end thereof and projects upwardly therefrom.

In Figures 1, 2 and 3, the stems 16 and, consequently, the curved ends 14, are hingedly connected together by a connecting bar 17 which has sockets 18 on its lower surface at opposite ends thereof adapted to receive balls 20 formed on the upper ends of the stems 16. This bar slidably extends through bearing blocks 21 mounted on the forward end of the frame 10. A lever 22 pivotally mounted between the runners 12, extends longitudinally of the sled and has at its free end a pin 23 extending into a slot 24 formed in the connecting bar 17 approximately midway between the ends thereof. The pivotal mounting for the lever 22 may be a shaft 25 journalled in a bearing 26 carried by the frame 10, said shaft extending through and above the frame and having a steering wheel 27 on its upper end.

In Figure 5, the pivotal connection between the stems 16 consists of a connecting link 28 hingedly connecting each stem with the lever 22. Each link is provided at its outer end with a socket 30 for receiving the ball 16 of a stem, and at its inner end with a ball 31 fitting into a socket 32 pivotally mounted on the lever.

In Figure 6, the lever 22 is omitted and the connecting bar 17 is provided with a rack 33 which meshes with a pinion 34 mounted on the lower end of the shaft 25.

In use, the steering wheel 27 is turned in either direction to steer the sled and this wheel is so connected to the forward ends of the runners 12 that the latter are tilted laterally as the wheel is turned, the side to which the runners tilt depending upon the direction of rotation of the wheel. As the runners tilt, the flared and curved ends 14 bite into the snow and positively turn the sled while said ends are suitably braced against the pressure of the snow bearing against the under sides of the ends at all times and particularly during the turning operation. Not only do the flared ends greatly assist the turning operation, but they help to guide the runners of the sled over the top of the snow instead of through it.

When the steering wheel of Figure 1 or 6 is turned, say to the left, the connecting bar 17 is moved in the same direction either by the lever 22 and its pin 23 or by the rack 33 and the pinion 34, said bar sliding through the blocks 21. This movement draws the upper ends of the stems 16 in the same direction, causing the runners 12 to tilt in unison towards the left. The further the runners are tilted the more the flared and curved ends 14 bite into the snow thus increasing the turning movement of the sled to the left. At all times and particularly as the sled is turning, the stems 16 brace the curved ends 14 since the pressure of the latter is exerted against the bar 17 and, consequently, the frame 10.

With the alternative of Figure 5, the sled is turned in the same manner, only in this case the lever 22 moves the connecting links 28 which, in turn, move the stems 16 to tilt the runners in the required direction. In this example, the rods 28 prevent the curved ends 14 from being bent back when the sled is being turned since the pressure is mainly exerted longitudinally of the rods which are seated at their inner ends in the socket 32.

From the above, it will be seen that a sled has been provided which may be steered and positively turned by tilting its runners and which has means for bracing the forward ends of the runners without interfering with the tilting thereof.

Various modifications may be made in this invention without departing from the spirit thereof or the scope of the claims, and, therefore, the exact forms shown are to be taken as illustrative only and not in a limiting sense, and it is desired that only such limitations shall be placed thereon as are disclosed in the prior art or are set forth in the accompanying claims.

What I claim as my invention:

1. A sled comprising a supporting frame having legs, runners pivotally connected to the legs, the forward end of each runner being curved upwardly and flaring laterally towards the outer end thereof, a stem projecting upwardly and rearwardly from each curved end adjacent its outer end, means pivotally connecting the stems together, and means for moving the connecting means laterally to tilt the runners in unison.

2. A sled comprising a supporting frame having legs, relatively wide runners pivotally connected to the legs, said runners being curved upwardly at their forward ends and flaring laterally from the beginning of the curve to the outer end thereof, a stem projecting upwardly and rearwardly from each curved end adjacent the outer end thereof, a lever pivotally mounted between the runners and extending longitudinally of the sled, a link hingedly connecting each stem to the lever adjacent its outer end, and means for pivoting the lever to tilt the runners in unison.

3. A sled comprising a supporting frame having legs, runners pivotally connected to the legs, the forward ends of said runners being curved upwardly, a stem projecting upwardly and rearwardly from each curved end adjacent the outer end thereof, a bar hingedly connecting the stems together, a rack on the connecting bar, a pinion mounted between the runners meshing with the rack, and means for rotating the pinion to move the bar laterally and tilt the runners in unison.

4. A sled comprising a supporting frame having legs, relatively wide runners pivotally connected to the legs, said runners being curved upwardly at their forward ends and flaring laterally from the beginning of the curve to the outer end thereof, a stem projecting upwardly and rearwardly from each curved end adjacent the outer end thereof, a bar hingedly connecting the stems together, bearing blocks mounted on the forward end of the frame through which the bar slidably extends, a rack on the connecting bar, a pinion mounted between the runners meshing with the rack, and means for rotating the pinion to move the bar laterally and tilt the runners in unison.

5. A sled comprising a supporting frame having legs, relatively wide runners pivotally connected to the legs, said runners being curved upwardly at their forward ends and flaring laterally towards the outer ends thereof, a stem projecting upwardly from each curved end adjacent its outer end, a bar hingedly connecting the stems together, said bar having a slot midway between the ends thereof, a lever pivotally mounted between the runners and extending longitudinally of the sled, a pin mounted on the lever adjacent its outer end extending into the slot of the connecting bar, and means for pivoting the lever to tilt the runners in unison.

6. A sled comprising a supporting frame having legs, runners pivotally connected to the legs, the forward ends of said runners being curved upwardly, a stem projecting upwardly from each curved end, a lever pivotally mounted between the runners and extending longitudinally of the sled, a bar hingedly connecting the links together, said bar having a slot midway between the ends thereof, bearing blocks mounted on the forward end of the frame through which the connecting bar slidably extends, a pin mounted on the lever adjacent its outer end extending into the slot of the bar, and means for pivoting the lever to tilt the runners in unison.

OLAF FOSBAK.